G. W. MARTIN.
AUTOMATIC RETAINING VALVE.
APPLICATION FILED AUG. 24, 1910.
993,263.
Patented May 23, 1911.
2 SHEETS—SHEET 1.
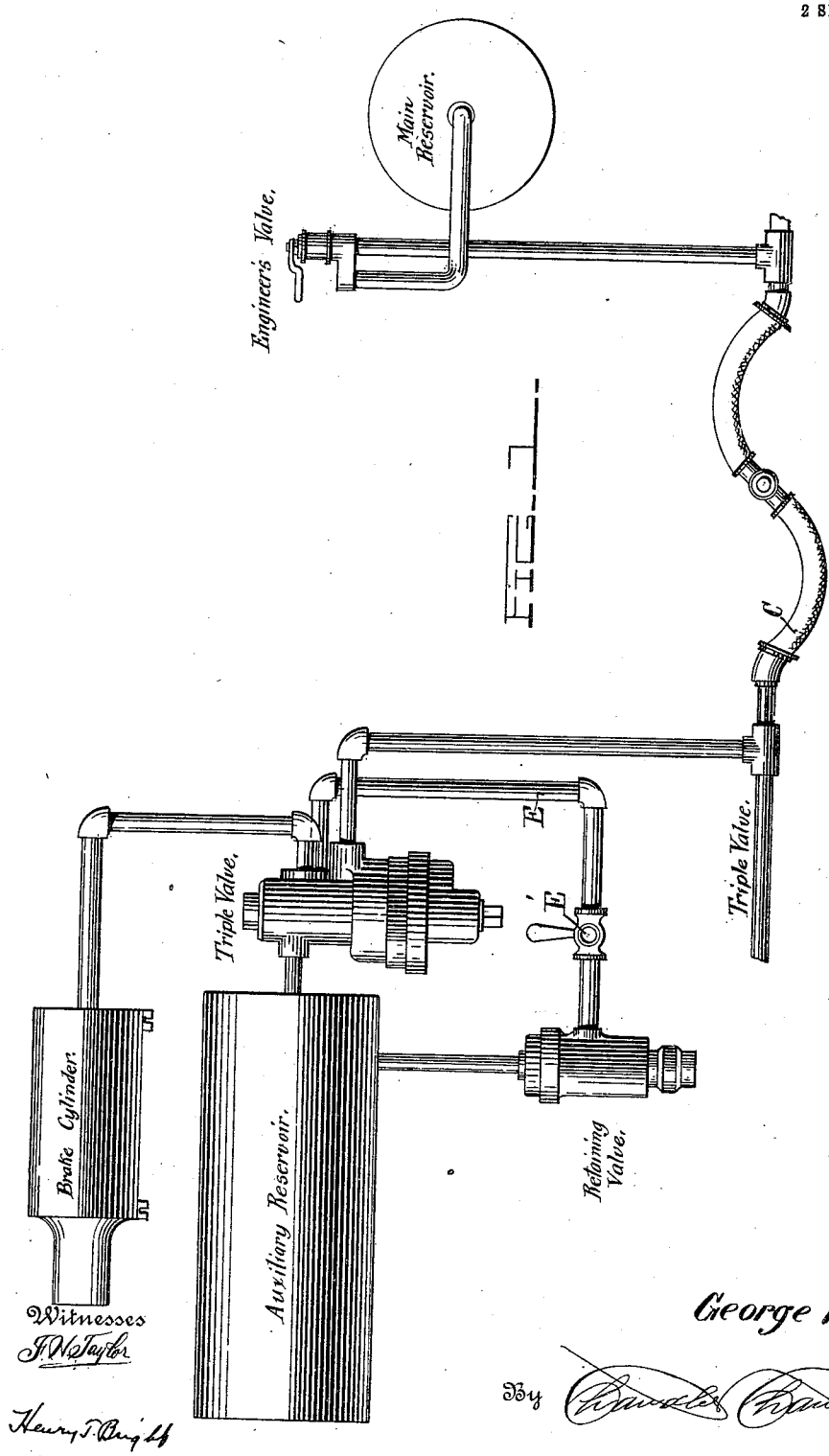

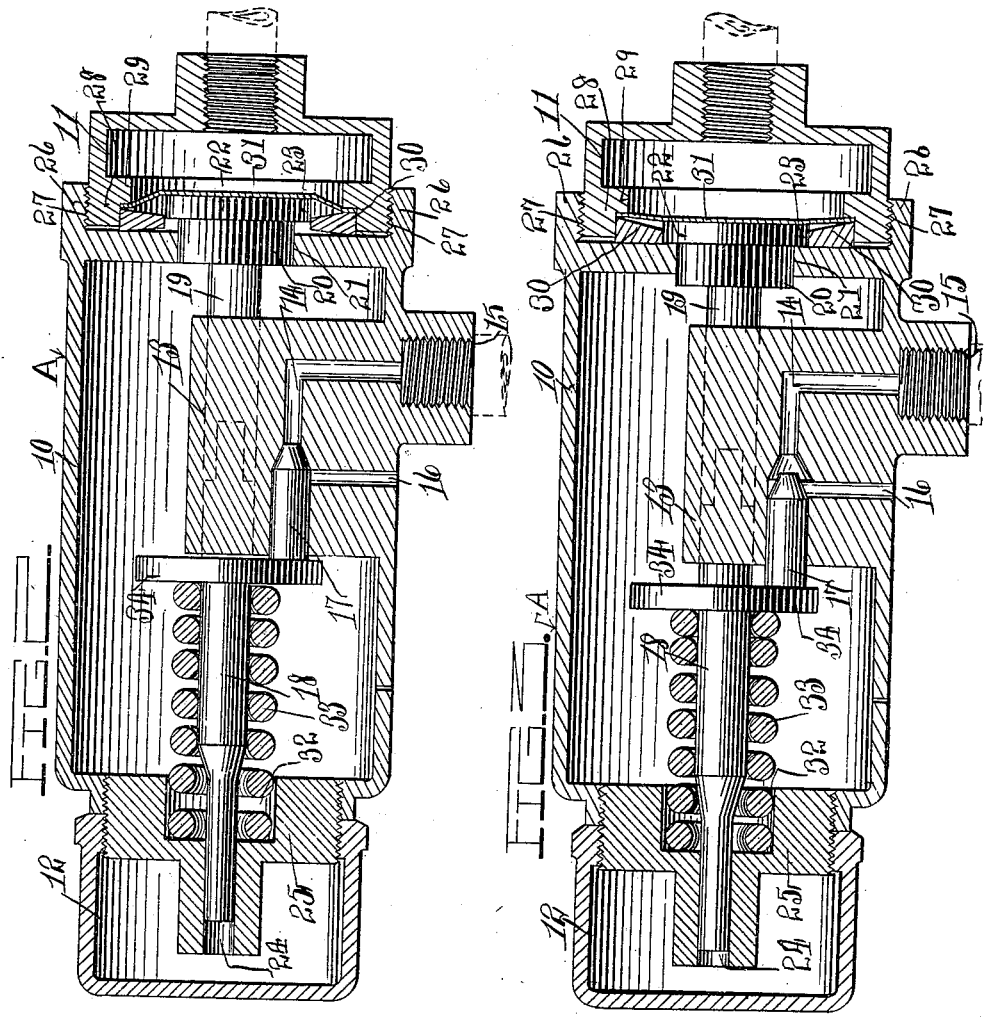

UNITED STATES PATENT OFFICE.

GEORGE W. MARTIN, OF CHISHOLM, MINNESOTA.

AUTOMATIC RETAINING-VALVE.

993,263. Specification of Letters Patent. Patented May 23, 1911.

Application filed August 24, 1910. Serial No. 578,640.

*To all whom it may concern:*

Be it known that I, GEORGE W. MARTIN, a citizen of the United States, residing at Chisholm, in the county of St. Louis, State of Minnesota, have invented certain new and useful Improvements in Automatic Retaining-Valves; and I do hereby declare the following to be a full, clear, and exact description of the invention, such as will enable others skilled in the art to which it appertains to make and use the same.

This invention relates to automatic retaining valves.

The object of the invention is to provide a new and improved retaining valve for use in fluid pressure brake systems of the Westinghouse and like types, and arranged to retain the pressure in the brake cylinder while recharging the auxiliary reservoir.

A further object of the invention resides in the provision of an automatic retaining valve of the type named which is controlled solely by the pressure from the auxiliary reservoir.

Still another object of the invention resides in the provision of an automatic retaining valve which will be exceedingly simple in construction, easy of application and certain in operation.

With the above and other objects in view the invention consists in the details of construction and in the combination and arrangement of parts as will be hereinafter more fully described and particularly pointed out in the appended claims.

In describing the invention in detail reference will be had to the accompanying drawings wherein like characters of reference denote corresponding parts in the several views; and in which, Figure 1 is a diagrammatic view showing the invention incorporated in a fluid pressure brake system of the Westinghouse type; Fig. 2, is a longitudinal section of the retaining valve showing the parts in the position they would occupy on the setting of the brakes and when the pressure in the auxiliary reservoir has been reduced as the result of such brake application; and, Fig. 3, a view similar to Fig. 2 showing the position of the parts of the retaining valve when the brakes have been released and the auxiliary reservoir recharged to normal pressure.

Referring to the drawings, the retaining valve is shown as comprising a casing A. This casing is formed of a central portion 10 and terminal portions 11 and 12. The central portion 10 has formed integral with its wall an inwardly extending lug 13 and this lug has formed therein a continuous passage 14, one end of which is adapted for connection with the triple valve exhaust as at 15, while its other end opens to the atmosphere as at 16. Slidably mounted in the lug 13 and adapted to open and close the passage 14 is a valve 17.

Slidably mounted in the casing A is a rod formed of separate sections 18 and 19; the formation of this piston in separate sections being resorted to in order to simplify the assembling of the valve. The adjacent ends of the sections 18 and 19 of the rod are supported in a suitable bearing in the lug 13. The outer end of the section 19 of the rod is enlarged as at 20 and this enlarged portion is mounted for movement in an opening 21 in one end of the central portion 10 of the casing. The outer end of the section 19 of the rod is again enlarged as at 22 so as to form a shoulder 23 adapted to bear against the end of the section 10 of the casing and thus limit the movement of said rod in one direction. The outer end of the section 18 of the rod is mounted in an opening 24 extending centrally through a plug 25 threaded in the adjacent end of the central portion 10 of the casing A. Said plug 25 being inclosed by the terminal portion 12 of the casing which is threaded on said plug.

The end of the central portion 10 of the casing which is adjacent the section 19 of the rod is provided with a longitudinally extending annular flange 26 which is threaded interiorly as at 27. Screwed into the threaded flange 26 is the terminal portion 11 of the casing which is formed after the manner of a cap and is provided with a threaded aperture in its outer end whereby the chamber formed by the portion 11 may be suitably connected in communication with the auxiliary reservoir of the brake system. The side wall of the portion 11 is provided with an inwardly extending annular flange 28 forming a shoulder 29. Secured between the shoulder 29 and the adjacent end of the portion 10 of the casing is a gripping ring 30 which serves to efficiently secure a diaphragm 31 in place against the shoulder 29 so as to close the inner end of the chamber formed by the portion 11 and dispose said diaphragm in engagement with the enlarged end 22 of the rod.

The plug 25 is provided centrally on its inner face with a recess 32 in which is seated one end of a tension spring 33, the other end of said spring abutting a flange 34 formed on the inner end of the section 18 of the rod. This flange 34 is sufficiently extensive to engage the inner end of the valve 17 when the rod is moved in one direction and shift said valve to closed position in the passage 14.

The operation of the valve is as follows: Assuming the brakes to have been released and the pressure in the auxiliary reservoir normal then the parts in the retaining valve will be in the position shown in Fig. 3, the rod having been moved to such position by the pressure exerted on one end thereof by the diaphragm 31, said diaphragm being actuated by the normal pressure from the auxiliary reservoir which is present in the chamber formed by the terminal portion 11 of the casing. It will of course be understood that this movement of the rod has been had against the resistance of the spring 33 which is tensioned at a strength slightly below the normal pressure of the auxiliary reservoir. Now, when the engineer reduces the pressure in the train pipe C and applies the brakes then the pressure in the auxiliary reservoir is likewise reduced and also the pressure in the chamber formed by the terminal portion 11 of the casing, which chamber is also in communication with the auxiliary reservoir. When this reduction of pressure in the auxiliary reservoir takes place, the rod is moved under the influence of the spring 33, which is now of greater strength than the pressure in the auxiliary reservoir, to the position shown in Fig. 2. This movement of the rod causes the flange 34 to engage the outer end of the valve 17 and move said valve so as to close the passage 14. By closing this passage 14 it will be apparent that the triple valve exhaust is also closed and the engineer is thus able to recharge the auxiliary reservoir without releasing the brakes. As soon as the brakes are released and the pressure in the auxiliary reservoir has become normal the parts of the valve will again assume the position shown in Fig. 3 as will be obvious. It will be noted that as the flange 34 moves out of engagement with the valve 17 that said valve will be shifted to the position shown in Fig. 3 by the exhaust pressure issuing from the triple valve.

The tension of the spring 33 may be varied by means of the plug 25 which is adapted to be moved inwardly and outwardly of the portion 10 of the casing by reason of its threaded engagement therewith. The terminal portion 12 of the casing also serves as a lock nut for maintaining the adjustment of the spring 33 had through the manipulation of the plug 25. A two-way valve E' is preferably arranged in the exhaust pipe E leading from the triple valve to the retaining valve to allow of cutting out the retaining valve whenever it is desired to do so, it being then understood that the exhaust from the triple valve passes to the atmosphere by way of the said valve E'.

What is claimed is:

1. An automatic retaining valve for fluid pressure brakes comprising a casing having connection with the triple valve exhaust and the auxiliary reservoir, a rod in said casing, means operated by a normal pressure from the auxiliary reservoir for moving said rod in one direction, means for moving said rod in the opposite direction when the pressure from the auxiliary reservoir falls below normal on setting the brakes, and a valve mounted independently of the rod for controlling the triple valve exhaust and operated by the movement of said rod on setting the brakes to close the triple valve exhaust.

2. An automatic retaining valve for fluid pressure brakes comprising a casing having connection with the triple valve exhaust and the auxiliary reservoir, a rod in said casing, a diaphragm in said casing engaging one end of said rod and operated by a normal pressure from the auxiliary reservoir to move said rod in one direction, means for moving said rod in the opposite direction when the pressure from the auxiliary reservoir falls below normal on setting the brakes, and a valve mounted independently of the rod for controlling the triple valve exhaust and operated by the movement of said rod on setting the brakes to close the triple valve exhaust.

3. An automatic retaining valve for fluid pressure brakes comprising a casing having connection with the triple valve exhaust and also having a chamber in communication with the auxiliary reservoir, a rod in said casing, having one end disposed in the chamber, a diaphragm located across said chamber engaging one end of said rod and operated by a normal pressure from the auxiliary reservoir to move said rod in one direction, means for moving said rod in the opposite direction when the pressure from the auxiliary reservoir falls below normal on setting the brakes, and a valve mounted independently of the rod for controlling the triple valve exhaust and operated by the movement of said rod on setting the brakes to close the triple valve exhaust.

4. An automatic retaining valve for fluid pressure brakes comprising a casing having connection with the auxiliary reservoir, an inwardly disposed lug formed integral with the casing and having a continuous passage therethrough, one end of which is connected to the triple valve exhaust and the other open to the atmosphere, a rod slidably mounted in said lug, means operated by a normal pressure from the auxiliary reservoir for moving said rod in one direction when the pressure in the auxiliary reservoir falls below normal on setting the brakes, and a valve slidably mounted in said lug for opening and closing the passage therethrough and adapted to be engaged by said rod to close said passage when said rod is moved on setting the brakes.

5. An automatic retaining valve for fluid pressure brakes comprising a casing having connection with the auxiliary reservoir, an inwardly disposed lug formed integral with the casing and having a continuous passage therethrough, one end of which is connected to the triple valve exhaust and the other open to the atmosphere, a rod slidably mounted in said lug, means operated by a normal pressure from the auxiliary reservoir for moving said rod in one direction when the pressure in the auxiliary reservoir falls below normal on setting the brakes, and a valve slidably mounted in said lug for opening and closing the passage therethrough and a flange on the rod adapted to engage the valve to shift the latter to close said passage when the rod is moved on setting the brakes.

6. An automatic retaining valve for fluid pressure brakes comprising a casing having a continuous passage in its wall, one end of which is connected to the triple valve exhaust and the other open to the atmosphere, said casing also having further connection with the auxiliary reservoir, a rod in said casing, means operated by a normal pressure from the auxiliary reservoir for moving said rod in one direction, means for moving said rod in the opposite direction when the pressure from the auxiliary reservoir falls below normal on setting the brakes, and a valve for opening and closing the passage in the wall of the casing and operated by the movement of said rod on setting the brakes to close said passage.

7. An automatic retaining valve for fluid pressure brakes comprising a casing having a continuous passage in its wall, one end of which is connected to the triple valve exhaust and the other open to the atmosphere, said casing also having connection with the auxiliary reservoir, a rod in said casing, means operated by a normal pressure from the auxiliary reservoir for moving said rod in one direction, means for moving said rod in the opposite direction when the pressure in the auxiliary reservoir falls below normal on setting the brakes, and a valve slidably mounted in the wall of said casing for opening and closing the passage in said wall and adapted to be engaged and shifted by the piston to close said passage when said rod is moved on setting the brakes.

In testimony whereof, I affix my signature, in presence of two witnesses.

GEORGE W. MARTIN.

Witnesses:
JOHN B. ROEKER,
CLYDE BLOUGH.

---

Copies of this patent may be obtained for five cents each, by addressing the "Commissioner of Patents. Washington, D. C."